United States Patent [19]

Reuveni et al.

[11] Patent Number: 4,723,341
[45] Date of Patent: Feb. 9, 1988

[54] MACHINE FOR REMOVAL OF TENDONS FROM HEAT

[75] Inventors: Zohar Reuveni; Natan Tal, both of Bet Herut, Israel

[73] Assignee: Hod Lavan Turkey Products Ltd., Bet-Herut, Israel

[21] Appl. No.: 26,570

[22] Filed: Mar. 17, 1987

[30] Foreign Application Priority Data

Dec. 25, 1986 [IL] Israel .................................. 81095

[51] Int. Cl.⁴ .............................................. A22C 21/00
[52] U.S. Cl. ............................................ 17/45; 17/11.3
[58] Field of Search .................. 17/11.3, 59, 60, 12, 17/11, 46, 45

[56] References Cited

U.S. PATENT DOCUMENTS

| | | | |
|---|---|---|---|
| 1,799,948 | 4/1931 | Bergen | 17/60 |
| 2,669,748 | 2/1954 | Ine | 17/11.3 |
| 4,527,305 | 7/1985 | Martin et al. | 17/11.3 |

*Primary Examiner*—Willie G. Abercrombie
*Attorney, Agent, or Firm*—Browdy and Neimark

[57] ABSTRACT

An automatic machine for the removal of tendons from cuts of meat by means of two flat profiled endless chains which run parallel to, and alongside a belt conveyor, on which the meat travels and which chains are adapted for gripping a tendon between them, a dividing member which is held at an angle above said conveyor directs the meat, and pulls the tendon to a different direction.

13 Claims, 4 Drawing Figures

MACHINE FOR REMOVAL OF TENDONS FROM HEAT

FIELD AND BACKGROUND OF THE INVENTION

The present invention relates to an automatic machine for the removal of tendons from meat.

Meat, in general, and Turkey-fillet for example, in particular, contains tendons. For obvious reasons, it is desirable to remove these tendons before the meat is marketed. Conventionally, tendons are extracted manually by skilled workers by pulling the tendons with one hand while the meat is held with the other hand. This manual operation, being performed by skilled workers, is quite obviously time-consuming and costly. Attempts are known to provide machinery for extracting tendons from meat. In fact there exists a number of patents in this field. In some of the specifications of earlier patents, there have been described mechanical devices which are manually actuated; some later patent specifications describe machines which do not require manual actuation. Finally there are known fully mechanical devices which however, only superficially constitute something similar to the present solution of the problem. Of all the arrangements which relate to the present invention, only U.S. Pat. No. 4,359,807 of Frank Adkinson & al., and U.S. Pat. No. 3,613,153 of E. L. McDonald are of interest, as the constructions which comprise, inter alia certain elements which are also present in the construction according to the present invention, but the mechanics as complete constructions are different from ours, as the reference to the abovementioned patents, and to the following description will show.

OBJECTS OF THE INVENTION

It is thus the object of the present invention to provide an automatic machine for the removal of tendons from meat.

It is yet another object of the present invention to provide a machine which will speed-up the operation without the need for the costly employment of skilled workers.

As a consequence of using an automatic machine, the operation of the removal of tendons is performed under conditions of cleanliness, thus obtaining a much hugher "clean" meat yield.

SUMMARY OF THE INVENTION

The machine according to the invention comprises a chassis which carries a belt conveyor, two flat profile endless chains or the like, which run parallel to and alongside the belt conveyor, and of which contacting runs are co-directional, so being adapted for gripping a tendon between them on top of the conveyor belt there being provided a dividing member directing the meat and the pulled tendons to different directions, means such as a hydraulic or electric motor being provided to drive the said conveyor belt and the said chains.

BRIEF DESCRIPTION OF THE DRAWINGS

The invention will now be described with reference to the annexed drawings in which.

DESCRIPTION OF PREFERRED EMBODIMENTS

Figure 1:
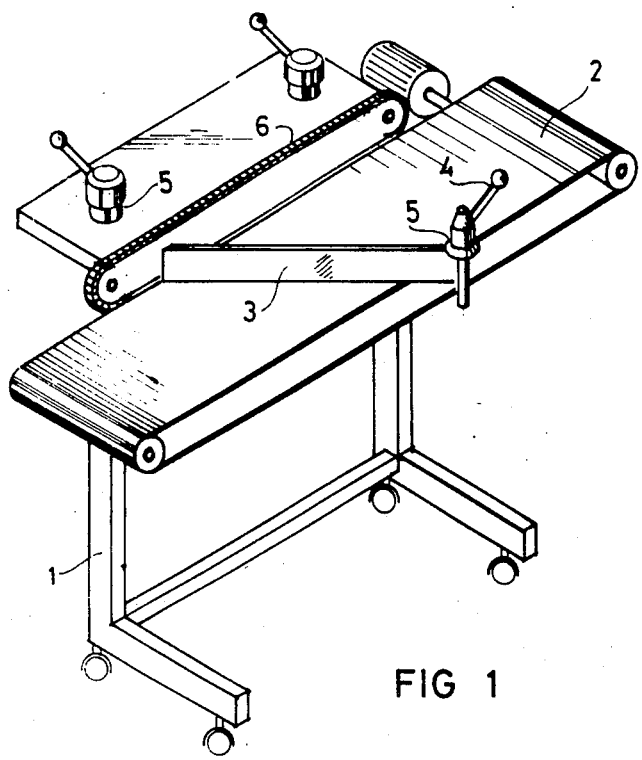
FIG. 1—is a schematic perspective view of the machine according to the invention.
Figure 2:
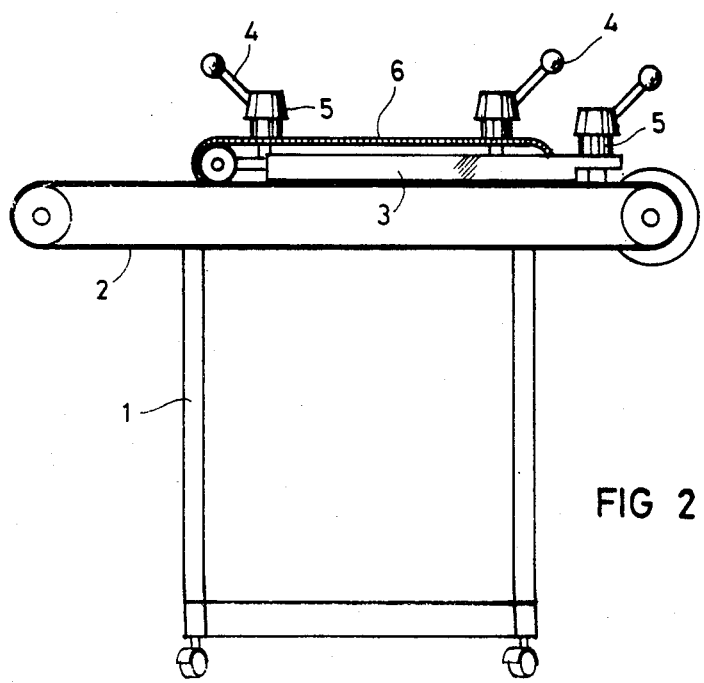
FIG. 2—is a side-view thereof.
Figure 3:
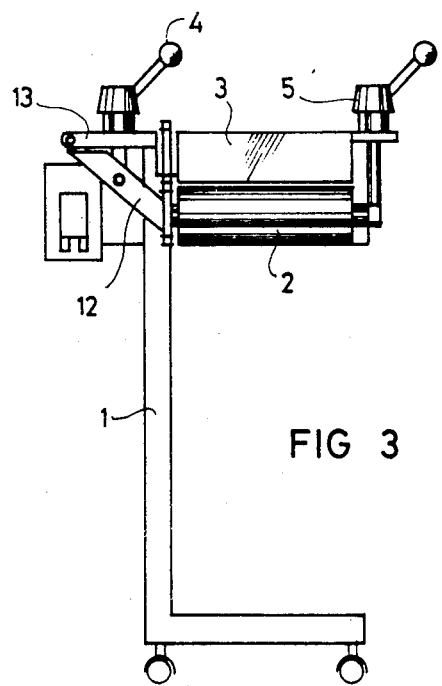
FIG. 3—is an end-view, while FIG. 4—is a detailed view of a part thereof, at an enlarged angle.
Figure 4:
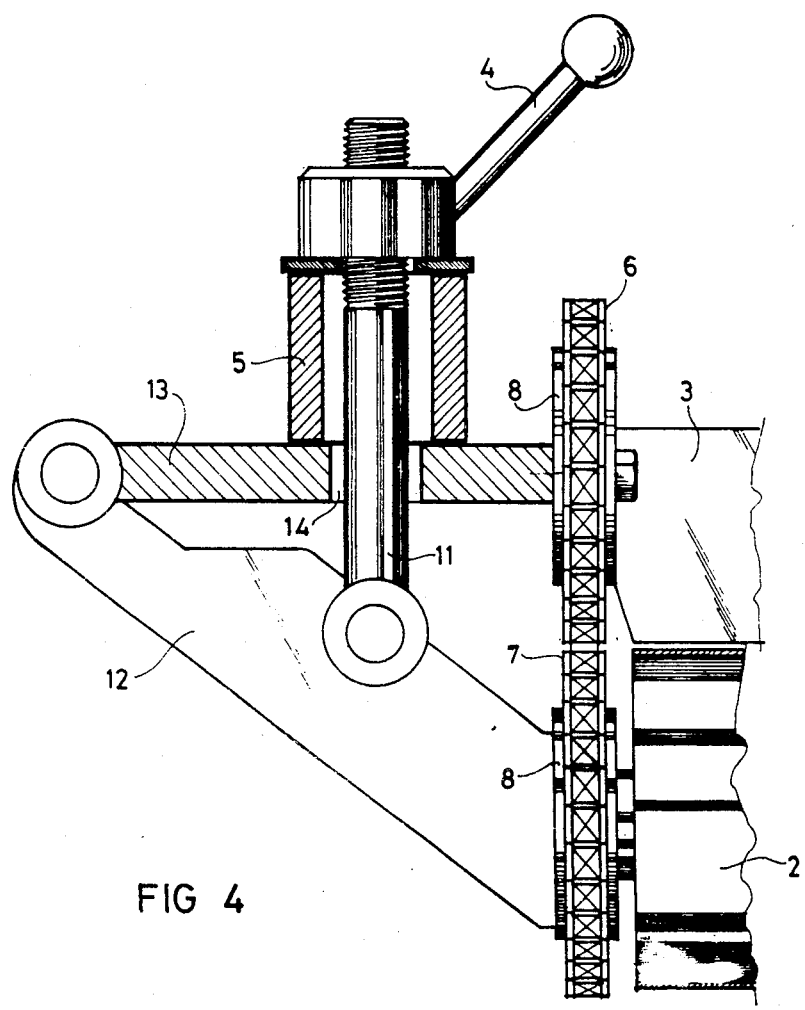

Turning first to FIG. 1, the machine comprises a chassis 1, which carries a conveyor belt 2. On the upper run of the conveyor belt 2, there is provided a divider-member 3, being a ruler-like part which extends obliquely across the upper run of the belt 2, and which is pressed to the belt and held in transversal and diagonal position by means of a screw-threaded handle 4, provided with a rubberbushing 5. Adjacent and parallel to the conveyor belt 2, run two flat profile endless chains 6 and 7 (FIG. 4) Intermediate to the upper and lower run of chains 6 and 7, there are provided two rulerlike parts 8 so that said rulers ensure the straight parallel movement of the chains. Said chains are pressed to each other and the contacting lower run of the upper chain 6, and the upper run of the lower chain 7, move co-directionally.

The machine is operated in the following manner:

The meat, such as Turkey Fillet, containing the outwardly extending tendon at the end, is placed on the moving belt 2, and moves along the belt unit close to the edge of the band until the tendon is caught between chains 6 and 7, and is pulled by them parallel to the moving belt. The tendon continues to be pulled by the chains and passes between the divider and moving belt; however, due to the divider, the meat does not continue to move, remaining on one side of the divider while simultaneously the tendon continues to be pulled by the chains causing thus the separation of the tendon from the meat. In order to keep the two chains urged against each other and to keep the ruler-like member 3 in its position-due to the importance of these positions, handles 4, 9 and 10 are provided which are fixed to internal screw-threaded members. Screwbolt 11 is pivotally connected to a rod 12, the one end of which is attached to the lower ruler-like part 8, while the other end is pivotally connected to plate 13 which is attached to the upper ruler-like member 8. Screwbolt 11 passes through hole 14 in plate 13, and through bushing 5. By turning handles 4, 9 or 10 to either direction, the correct adjustment is achieved.

We claim:

1. A device for the removal of tendons from meat, such as Turkey-Fillet, comprising in combination: conveyor means for moving the meat at a predetermined velocity, means for contacting and gripping the tendon protruding from said piece of meat, said gripping means moving parallel with the conveyor means, mechanical deflection means positioned at an angle with said conveyor means, rigidly attached to a suitable support means above said conveyor means, the arrangement being such that the tendon is gripped, and when the meat encounters the deflecting means, said deflector deflecting the direction of movement of the meat while the tendon is simultaneously pulled out from said piece of meat, the meat and tendon being separately received by suitable receiver means.

2. A device according to claim 1, where the conveyor means and the gripping means move at essentially the same velocity.

3. A device according to claim 1 where the linear velocity of the conveyor means is of the order of 50 cm/second.

4. A device according to claim 1, where the deflecting means comprises a rectangular member positioned at an angle of about 30° with the central line of the conveyor leaving a gap of some millimeters between the conveyor and the lower edge of the rectangular member.

5. A machine according to claim 1, for the removal of tendons from meat which comprises a chassis which carries a conveyor belt, two flat profiled endless chains or the like, which run parallel to, and alongside said belt conveyor, and the co-directional contacting runs which are adapted to grip a tendon between them on top of the conveyor belt, there being provided means for directing meat and pulling tendons in different directions, driving means being provided for the said conveyor belt and said chains.

6. A machine as claimed in claim 5, where the chains are flat-type metal chains.

7. A machine as claimed in claim 5, where the chains are of rubber or the like.

8. A machine as claimed in claim 5, where the deviating means is a ruler-like member.

9. A machine as claimed in claim 5, where the driving means is an electric motor or hydraulic motor.

10. A method for mechanically removing tendons from meat, and especially Turkey fillet, which comprises moving the fillet on a suitable conveyor, gripping the protruding tendon edge by gripping means moving parallel to said conveyor, deflecting the path of movement of the fillet by mechanical deflection means, at an angle with the movement of the conveyor while pulling out the tendon by said gripping means.

11. A device according to claim 2, where the linear velocity of the conveyor means is of the order of 50 cm/second.

12. A device according to claim 2, where the deflecting means comprises a rectangular member positioned at an angle of about 30° with the central line of the conveyor leaving a gap of some millimeters between the conveyor and the lower edge of the rectangular member.

13. A device according to claim 3, where the deflecting means comprises a rectangular member positioned at an angle of about 30° with the central line of the conveyor leaving a gap of some millimeters between the conveyor and the lower edge of the rectangular member.

* * * * *